United States Patent
McCraw

(10) Patent No.: US 7,546,647 B1
(45) Date of Patent: Jun. 16, 2009

(54) BEDDING FOUNDATION AND SUPPORT MODULE THEREFOR

(75) Inventor: Kevin N. McCraw, Micaville, NC (US)

(73) Assignee: Hickory Springs Manufacturing Company, Hickory, NC (US)

(*) Notice: Subject to any disclaimer, the term of this patent is extended or adjusted under 35 U.S.C. 154(b) by 0 days.

(21) Appl. No.: 12/148,613

(22) Filed: Apr. 21, 2008

(51) Int. Cl.
  *F16F 3/00* (2006.01)
  *A47C 23/02* (2006.01)

(52) U.S. Cl. .............................. 5/247; 5/255; 267/103
(58) Field of Classification Search .................. 5/247, 5/255, 719; 267/103–110, 165
See application file for complete search history.

(56) References Cited

U.S. PATENT DOCUMENTS

| | | | |
|---|---|---|---|
| 887,112 A | 5/1908 | Naber | |
| 3,737,927 A | 6/1973 | Kline et al. .................... 5/260 |
| 4,377,279 A | 3/1983 | Schulz, Jr. et al. .......... 267/103 |
| 5,052,064 A | 10/1991 | Hagemeister et al. ......... 5/246 |
| 5,346,188 A | 9/1994 | Rodgers et al. ............. 267/106 |
| 5,361,434 A | 11/1994 | Hagemeister et al. .......... 5/247 |
| 5,395,097 A | 3/1995 | Dabney et al. .............. 267/103 |
| 5,562,274 A | 10/1996 | Kitchen et al. ............. 267/103 |
| 5,622,357 A | 4/1997 | Schulz, Jr. et al. .......... 267/103 |
| 5,704,595 A | 1/1998 | Kitchen et al. ............. 267/103 |
| 5,967,499 A | 10/1999 | McCraw et al. ............. 267/103 |
| 6,353,953 B1 | 3/2002 | Tanaka et al. .................. 5/723 |
| 6,651,276 B2 | 11/2003 | McCraw et al. ................ 5/246 |
| D544,284 S | 6/2007 | Huang ......................... D6/606 |
| 7,356,859 B2 * | 4/2008 | McCraw ......................... 5/247 |
| 7,360,263 B2 * | 4/2008 | McCraw ......................... 5/247 |
| 2007/0124860 A1 | 6/2007 | Mauro et al. .................... 5/247 |
| 2007/0174961 A1 | 8/2007 | McCraw ......................... 5/247 |
| 2007/0180614 A1 | 8/2007 | McCraw ......................... 5/247 |

* cited by examiner

*Primary Examiner*—Alexander Grosz
(74) *Attorney, Agent, or Firm*—K&L Gates LLP

(57) ABSTRACT

A support module for a bedding foundation comprises two wire-form elements each a single length of wire configured to have a central bridge portion, two spaced legs extending in a common direction therefrom, and feet at terminal ends of the legs. The bridge portion the feet lie in parallel planes with the legs extending therebetween. The feet of one wire-form element are affixed to the bridge portion of the other wire-form element with the respective legs of both elements extending in a common direction and with the bridge portion of the one element and the feet of the other element in a common plane. The bridge portion of the other wire-form element is secured to a base of a bedding foundation and the feet of the other wire-form element and the bridge portion of the one wire-form element are secured to a support surface of a bedding foundation.

42 Claims, 11 Drawing Sheets

BEDDING FOUNDATION AND SUPPORT MODULE THEREFOR

FIELD OF THE INVENTION

The present invention generally relates to bedding foundations such as are commonly referred to as box springs and to components commonly referred to as support modules used in the fabrication of bedding foundations to support rigidly a support surface such as a wire grid assembly above a lower foundation base.

BACKGROUND OF THE INVENTION

In the past, bedding sets, also referred to as mattress sets, typically included an upper spring-core mattress formed of a resiliently compressible assemblage of helical coil springs and a lower foundation commonly referred to as a box spring also formed of a compressible spring core but substantially more firm than the mattress. Over recent years, however, as mattress designs have changed and improved, it has become more common for bedding sets to include a substantially rigid non-compressible bedding foundation, whose primary function is to provide an elevated support surface for the mattress. The present invention relates to such essentially rigid bedding foundations which, although generally not comprising any springs per se, are still commonly referred to as box springs.

A completed bedding foundation comprises several diverse components which are typically made by different manufacturers. The internal structure of a bedding foundation is substantially entirely constructed of wire components and is typically made by a first manufacturer. This wire structure may include a plurality of support modules or other support structures connected to a wire grid assembly that forms a support surface. The wire structure is mounted onto a wooden slatted base typically made by another manufacturer, often also the manufacturer of the finished foundation. The process of making the completed bedding foundation is accomplished by attaching the wire structure to the wooden slatted base, and then applying padding and a fabric cover about the core structure.

There are many different known embodiments of the wire structure used in bedding foundations, but a common characteristic of many recent designs is that the wire structure has a configuration that enables multiple wire structures to be nested with each other in a stacked assembly to enhance their compactness for shipping and storage purposes and thereby reduce the associated costs. Specifically, when one wire structure is placed atop another like wire structure, portions of the upper wire assembly fit at least partially within the lower wire assembly, whereby their assembled height is less than the sum of their individual heights. Various examples of such nestably stackable configurations are known, such as are disclosed in U.S. Pat. Nos. 5,967,499, and 5,052,064.

SUMMARY OF THE PRESENT INVENTION

It is a basic object of the present invention is to provide a novel and nonobvious type of bedding foundation and a support module for use in such foundations which will permits simplified and low-cost manufacture of bedding foundations while retaining the advantages of known foundations, e.g., nestable stackability.

Briefly summarized, the present invention, according to a basic aspect thereof, provides a uniquely configured support module for use in a bedding foundation between a lower base and an upper support surface. According to the present invention, the support module comprises two wire-form elements each consisting of a single length of wire formed into a configuration presenting a central bridge portion, two spaced-apart legs extending in a generally common direction from spaced locations on the central bridge portion, and two spaced-apart feet each at a terminal end of a respective one of the legs. The central bridge portion extends in a plane transverse relative to the legs and the feet lie in a common plane with each other spaced by the legs from and essentially parallel to the plane of the bridge portion. The feet of one wire-form element are affixed to the bridge portion of the other wire-form element with the respective legs of both wire-form elements extending in a generally common direction and with the bridge portion of the one wire-form element and the feet of the other wire-form element disposed in a common plane. In this manner, the bridge portion of the other wire-form element is adapted for securement to the lower base of a bedding foundation and the feet of the other wire-form element and the bridge portion of the one wire form element are adapted for securement to the upper support surface of a bedding foundation.

A bedding foundation utilizing the support modules of the present invention basically comprises a wire grid assembly to which a plurality of the support modules are affixed such that the wire grid assembly forms a support surface adapted to serve as the upper support surface in a fully assembled bedding foundation. The wire grid assembly includes a rectangular border wire having parallel ends and parallel sides, with a plurality of lateral grid wires extending in spaced parallel relation to one another between the sides of the border wire and a plurality of longitudinal grid wires extending in spaced parallel relation to one another between the ends of the border wire and perpendicularly to the lateral grid wires. The plural support modules are arranged in a laterally and longitudinally spaced array relative to the wire grid assembly, each support module having the feet of its other wire-form element and the bridge portion of the one wire form element affixed to adjacent ones of the lateral or longitudinal grid wires.

Various embodiments of the present support module are possible within the scope and spirit of the present invention. For example, the two wire-form elements of each support module may be of identical or different configurations. The bridge portion of each support module may have a symmetrical configuration which may be accomplished by varying different shapes, e.g., ovoid, arcuate, triangular, or sinusoidal. In each case, the shape of the bridge portion of each support module also preferably provides an elongate extent. In turn, the feet of the one wire-form element of each support module may preferably be affixed symmetrically to the bridge portion of the other wire-form element thereof.

It is further preferred that the legs of each wire-form element may be inclined obtusely relative to bridge portion. The legs of at least one of the wire-form elements, and preferably both wire-form elements, of each support module may be oriented to diverge relative to one another in the direction away from the bridge portion, or may be oriented to converge relative to one another in the direction away from the bridge portion, or, alternatively, may be arranged essentially parallel to one another.

In one embodiment of a bedding foundation according to the invention, at least selected support modules, preferably every support module, may be affixed only to respectively adjacent lateral grid wires which permits the support modules to be located at spacings independently of the location of the longitudinal grid wires and not dependent on the dimensions of the modules. In an alternative embodiment, at least selected support modules, preferably every support module, may be affixed only to respectively adjacent longitudinal grid wires independently of the location of the lateral grid wires. A hybrid embodiment wherein modules may be affixed to both lateral and longitudinal grid wires is also possible.

A bedding foundation according to the invention may further include a lower base underlying the plurality of support modules and having a rectangular configuration essentially corresponding to the rectangular configuration of the wire grid assembly. The lower base has a plurality of slats arranged in spaced parallel relation to one another, with the bridge portion of the other wire-form element of each support module being affixed to a respective one of the slats.

In the preferred embodiments of the modules of the present invention, the module is nestable with a like module, and in turn, the bedding foundation made from the modules is nestable with a like bedding foundation.

It is to be understood that both the foregoing general description and the following detailed description are exemplary and provided for purposes of explanation only, and are not restrictive of the invention as claimed. Further features and objects of the present invention will become more fully apparent in the following description of the preferred embodiments and from the appended claims.

DETAILED DESCRIPTION OF THE PREFERRED EMBODIMENTS

Referring now to the accompanying drawings, it will be appreciated and understood by persons skilled in the art that the support module of the present invention and bedding foundations incorporating such modules are susceptible of many and varied embodiments. The accompanying drawings in conjunction with the following detailed description thereof are intended to provide representative examples of contemplated possible embodiments, for purposes of providing a sufficient disclosure to enable persons in the relevant industry to understand the invention. However, it is to be further understood that the drawings and the following description are not intended to limit or restrict the invention, but are merely exemplary to explain the scope and the spirit of the present invention.

Figure 21:
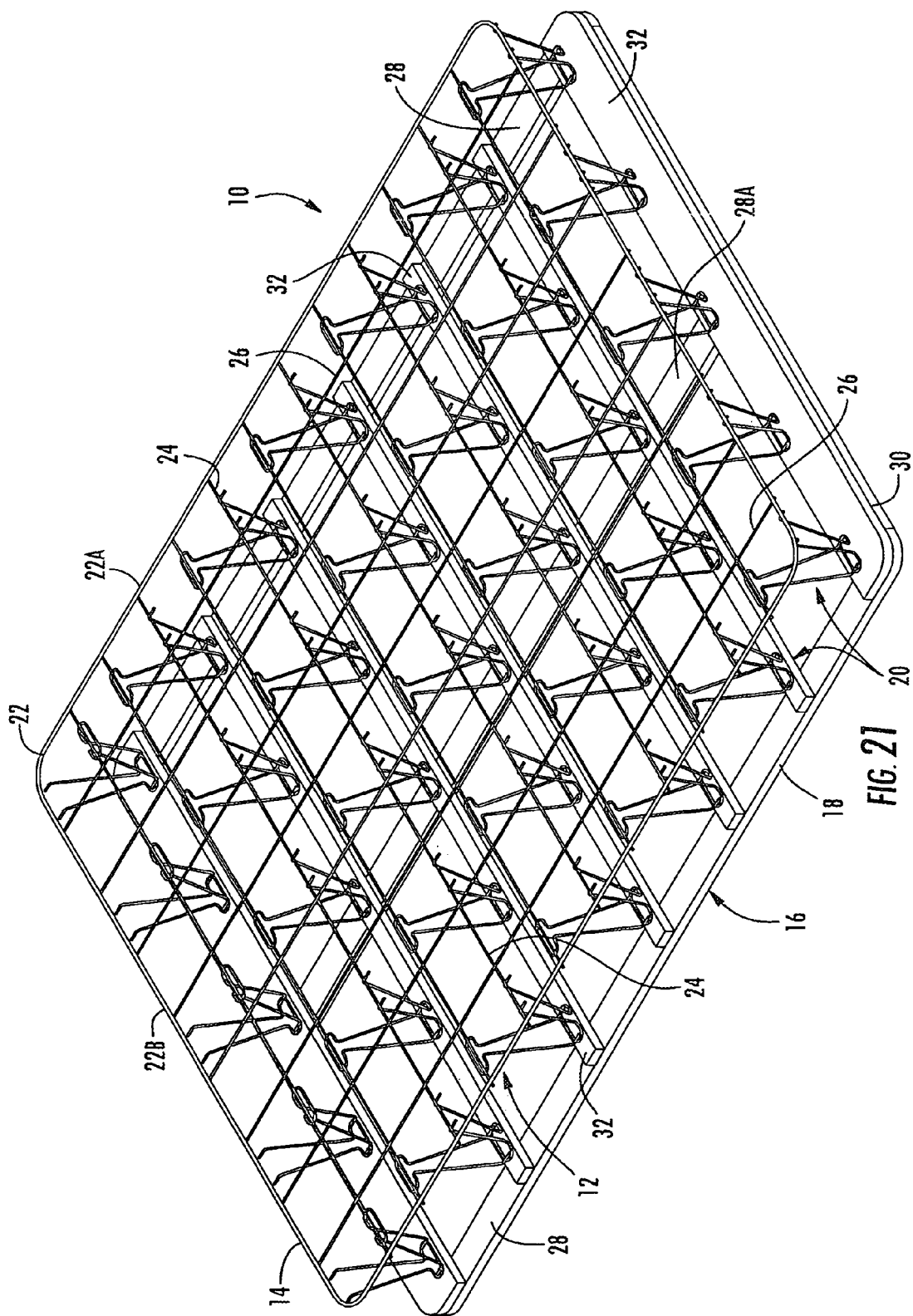
FIG. 21 is a perspective view of a complete bedding foundation structure (excluding padding and fabric covering) constructed utilizing the support modules of FIG. 1.
Figure 22:
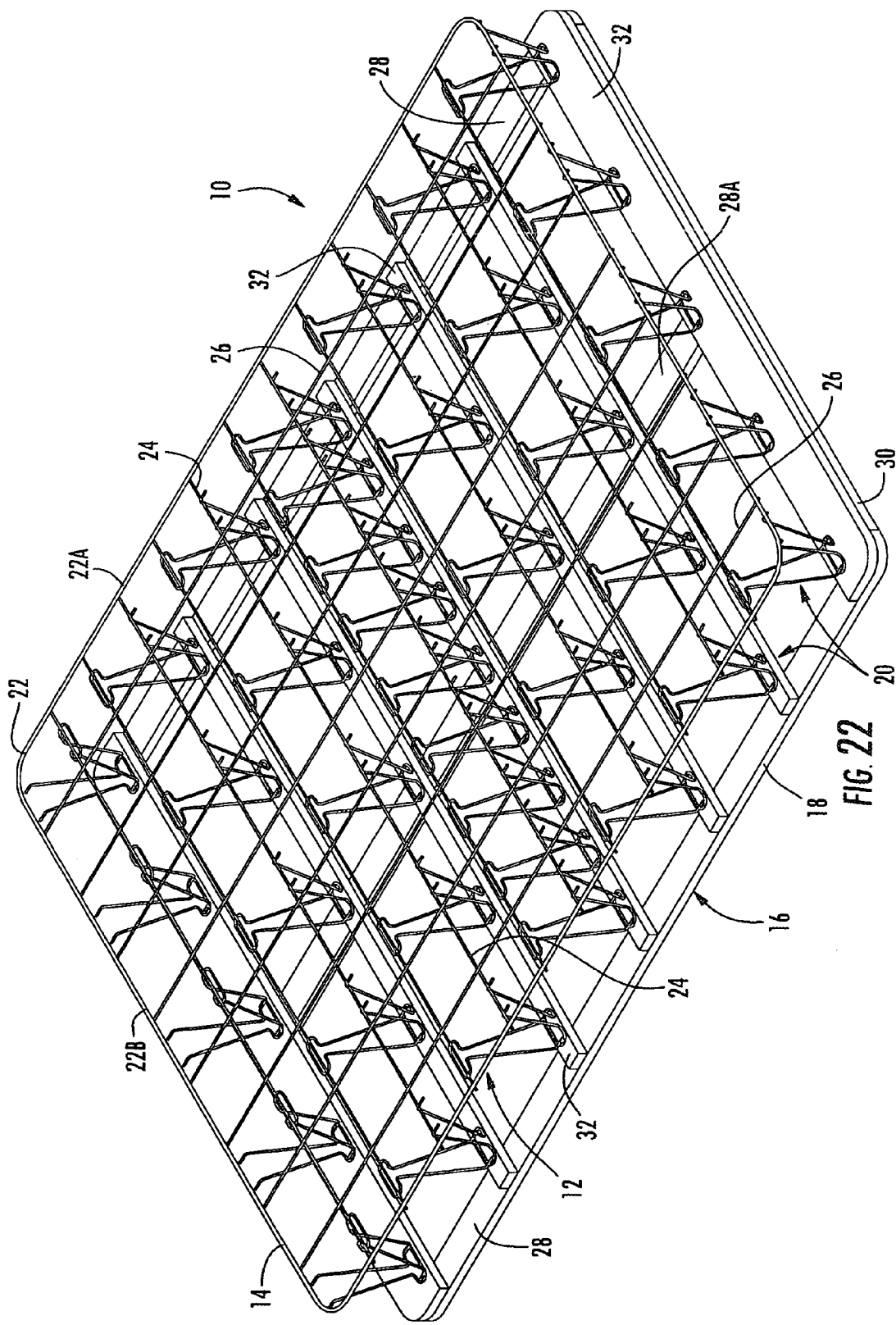
FIG. 22 is another perspective view of a complete bedding foundation constructed utilizing the support modules of FIG. 1, similar to FIG. 21, but selectively incorporating additional support modules.

With reference initially to FIGS. 21 and 22, each Figure depicts a complete bedding foundation structure in accordance with the present invention, excluding the typical upholstery components such as padding, fabric, stitching and other finishing elements, in order to enhance the illustration and understandability of the invention. In each of FIGS. 21 and 22, the overall bedding foundation as a whole is indicated generally by the reference numeral 10 and basically comprises an upper support surface 12, typically and preferably in the form of a rectangular wire grid assembly 14, a lower base 16, preferably in the form of a correspondingly rectangular wooden frame 18, and a plurality of support modules 20, preferably embodied as wire-form structures, disposed in a lengthwise and widthwise array between the wooden frame 18 of the base 16 and the wire grid assembly 14 of the upper support surface 12 to integrate the entire bedding foundation 10 as an essentially rigid structure with the upper support surface 12 and the lower base 16 disposed in spaced parallel relation to one another. In this manner, with the addition of padding and an upholstery covering enclosing the bedding foundation 10, the foundation is adapted and well suited to serve as a foundational support for a mattress (not shown), as is well known in the relevant state of the art.

The wire grid assembly 14 is fabricated of discreet wire components integrally welded together into a rectangular planar configuration, including a perimeter border wire 22, with a plurality of lateral grid wires 24 extending in spaced parallel relation across and welded at their terminal ends to the sides 22A of the border wire 22 and with a plurality of longitudinal grid wires 26 similarly extending in spaced parallel relation to one another and perpendicularly to the lateral grid wires 24 lengthwise along and welded at their terminal ends to the ends 22B of the border wire 22. The lateral and longitudinal grid wires 24, 26 are additionally welded to one another at their crossing points.

The wooden frame 18 of the lower base comprises a wooden perimeter subframe formed of two outer longitudinal rails 28 secured together (e.g., by nails, brads, staples, or the like) in spaced parallel relation by wooden cross members 30, forming the subframe in a rectangular configuration substantially corresponding in dimension to the wire grid assembly 14. One or more additional intermediate longitudinal rails 28A are similarly affixed between the cross members 30 and in parallel relation to the outer rails 28. A plurality of wooden lateral slats 32 are similarly secured by nails, brads, staples or the like widthwise across the lengthwise rails 28, 28A in spaced parallel relation to one another and to the cross members 30. In this manner, the wooden frame 18 is similarly formed as an integrated rigid rectangular planar structure.

The support modules are arranged between the wooden frame 18 and the wire grid assembly 14 in a lengthwise and widthwise array, each support module 20 having a top portion 44 (as more fully described hereinafter) welded to the wires 22, 24 of the wire grid assembly 14 and a base portion 42 (also more fully described hereinafter) which may be secured, e.g., by staples, to the slats 32 of the wooden base frame 18.

In accordance with the present invention, the support modules 20 are uniquely fashioned as wire-form structures in a novel and non-obvious configuration to provide distinct advantages over prior known support modules, as more fully described hereinafter. With reference now to FIGS. 1-8, one representative preferred embodiment of a support module 20 of the present invention is depicted in the form and configuration of the support module incorporated into the bedding foundations 10 of FIGS. 21 and 22. Basically, the support module 20 is fabricated from two discreet wire-form elements 34, each fashioned from a single length of wire formed into a configuration presenting a central bridge portion 36, two spaced-apart legs 38 extending in a generally common direction from spaced locations on the central bridge portion 36, and two spaced-apart feet 40 each at a terminal end of a respective one of the legs 38.

Figure 5:
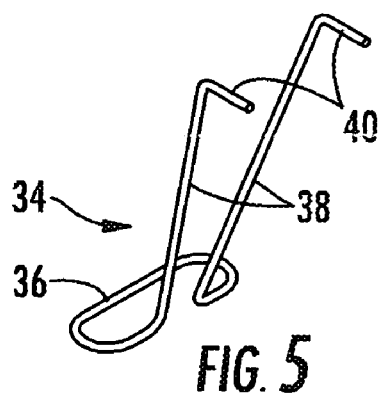
FIG. 5 is a perspective view of a single wire element of the support module of FIG. 1.
Figure 6:
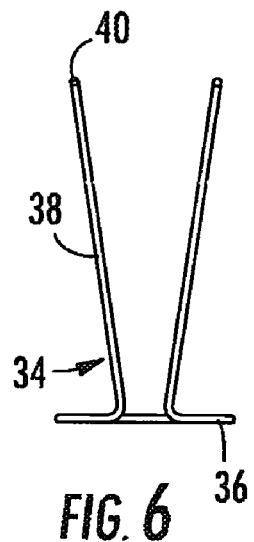
FIG. 6 is a front elevational view of the single wire element of FIG. 5.
Figure 7:
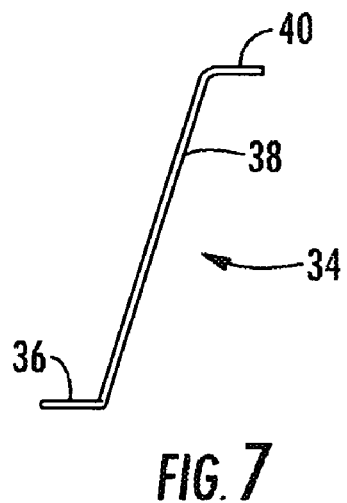
FIG. 7 is a side elevational view of the single wire element of FIG. 5.
Figure 8:
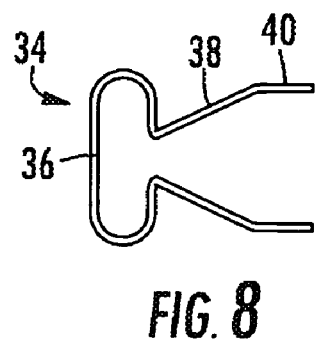
FIG. 8 is a top plan view of the single wire element of FIG. 5.

A single one of such wire-form elements 34 is depicted separately in perspective view in FIG. 5, and respectively in front and side elevations and a top plan view in FIGS. 6-8. The central bridge portion 36 of each wire form element 34 in the support modules 20 is formed in a substantially elongated and symmetrical oval or ovoid shape (see FIG. 8) disposed in a single geometric plane. The two legs 38 extend from spaced-apart symmetrical locations (see FIG. 8) at one side of the central bridge portion 36 away therefrom and in substantially symmetrical diverging relation relative to one another (see FIG. 6) in a common plane which is substantially transverse to the plane of the central bridge portion 36 at an obtuse angle therebetween (see FIG. 7). The feet 40 extend respectively from the terminal ends of the legs 38 outwardly at a correspondingly obtuse angle (see FIG. 7) to project therefrom in a direction opposite the central bridge portion 36, with the feet 40 thereby extending in a common plane with one another which is substantially parallel to the plane of the central bridge portion 36.

Each support module 20 is fabricated of two of the wire-form elements 34 secured together (e.g., by welding) in relatively inverted relationship, forming module 20 in an overall cup-like configuration. More specifically, as best seen in FIGS. 1-4, the feet 40A of one wire-form element 34A are affixed to the central bridge portion 36B of the other wire-form element 34B at symmetrical locations along the side of such bridge portion 36B opposite the legs 38B of such other wire-form element 34B, with the respective legs 38A, 38B of the two wire-form elements 34A, 34B extending in an essentially common direction away from their joined bridge portion and feet 36B, 40A but with the respective legs 38A, 38B slightly diverging relative to one another (see FIG. 3), such that the bridge portion 36A of the one wire-form element 34A and the feet 40B of the other wire-form element 34B are disposed in a common plane spaced by their respective legs 38A, 38B from but substantially parallel to the plane in which their respective feet 40A and bridge portion 36B are affixed together (see FIGS. 2 and 3) and, in such common plane, the feet 40B of the other wire-form element 34B and the bridge portion 36A of the one wire-form element 34A project away from each other (see FIGS. 3 and 4). In this manner, the joinder between the feet 40A of the one wire-form element 34A and the bridge portion 36B of the other wire-form element 34B form a base portion of the support module 20 generally indicated at 42 in FIG. 1 adapted to be stapled or otherwise secured to the wooden base frame structure 18 in the bedding foundation 10, while the bridge portion 36A of the one wire-form element 34A and the feet 40B of the other wire-form element 34B collectively form a top portion of the support module 20 generally indicated at 44 in FIG. 1, adapted to be welded or otherwise secured to the upper wire grid assembly 14 of the bedding foundation 10.

Advantageously, the described configuration of the support module 20 provides several distinct advantages in the fabrication of the bedding foundations 10 in FIGS. 21 and 22. The elongated symmetrical configuration of the base portion 42 of the support module 20 provides sufficient width, i.e., in the elongated dimension of the base portion 42, to provide stability in the support module 20 when stapled or otherwise secured to the wooden base frame 18 so as to resist side-to-side motion or deflection of the support module 20 and also to better distribute downward loads transmitted from a mattress disposed on top of the foundation 10. The lateral spacing accomplished between the bridge portion 36A and feet 40B forming the top portion 44 of the support module 20 also provides sufficiently spaced weld points for securement of the support module 20 to the wire grid assembly 14 to provide further load stability. In addition, the configuration of the modules 20 to have a cup-like shape allows partial foundation assemblies comprised of the wire grid assembly 14 with modules 20 welded thereto to be nestably stackable for convenient compact shipment and storage prior to assembly with wooden frames 18.

The configuration of the top portion 44 of each module 20 is also such that, with the support modules 20 attached to the lateral slats 32 of the wooden base frame 18, the top portions 44 of the various support modules 20 may be welded solely to the lateral grid wires 24 of the wire grid assembly 14, without any of the modules 20 having to be welded to any of the longitudinal grid wires 26, which accomplishes two advantages: The longitudinal grid wires 26 may be located with greater flexibility as to their relative spacing and dispositions across the wire grid 14 since the longitudinal grid wires 26 are not required to provide welding locations for the modules 20. Further, with all modules 20 being affixed only to the lateral grid wires 24, the attachment points for welding top portions 44 of the modules 20 to the lateral grid wires 24 will all be aligned in straight lines defined by the lateral grid wires 24, which simplifies the welding process. Also, greater flexibility is provided in the number of modules 20 which can be selectively affixed to any given lateral slat 32 in the wooden frame 18, allowing additional modules to be placed selectively in differing lateral rows across the bedding foundation 10 when desired for enhanced strength and support, such as representatively depicted in FIG. 22.

With reference now to FIGS. 9-20, several additional embodiments of support modules 20 in accordance with the present invention are illustrated. In each alternative embodiment, the support modules are formed of two discreet wire-form elements each configured to have a central bridge portion, legs and feet, whereby like referenced numerals are used for the corresponding components in FIGS. 9-20. It is contemplated, within the scope and spirit of the present invention, that the central bridge portion 36 may be fashioned in various configurations, geometric and otherwise, and the orientation of the legs 38 relative to one another and to the bridge portion 36 may be varied. It is also contemplated to be possible to form support modules 20 from two discreet wire-form elements 34 of differing configurations. FIGS. 9-20 representatively illustrate these various possibilities, but without exclusion of other various embodiments which will naturally and logically occur to persons skilled in the relevant art.

Figure 9:
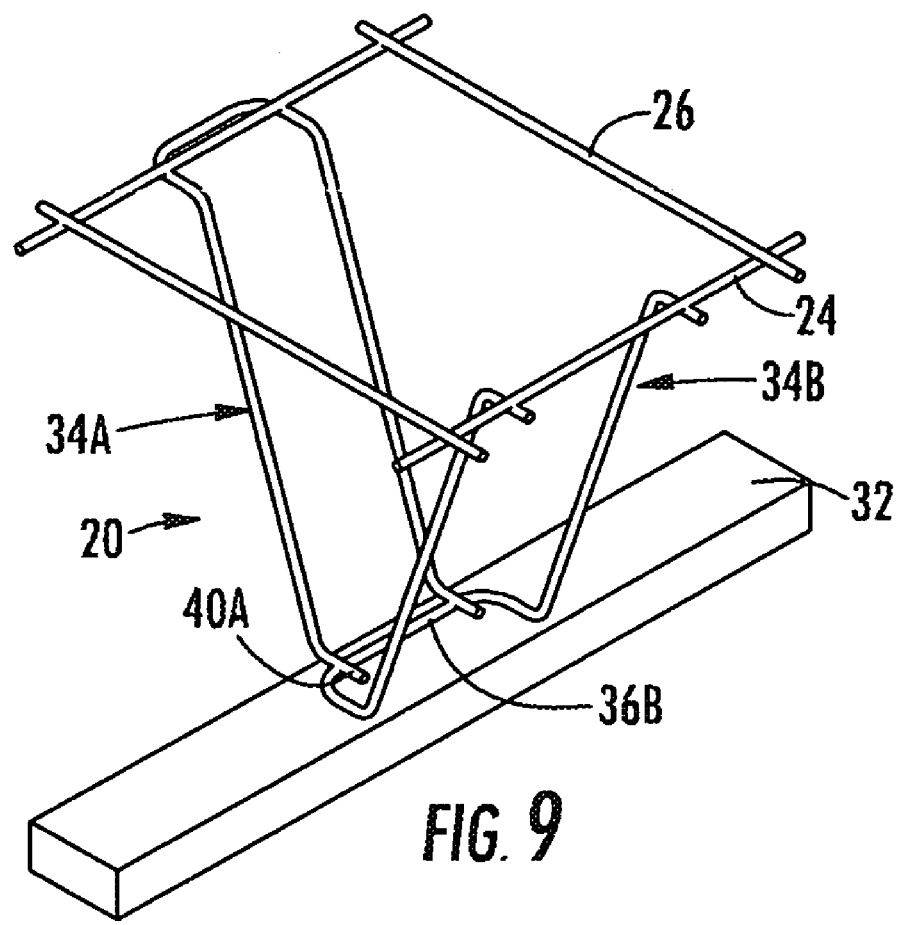
FIG. 9 is a perspective view of a fragmentary section of a bedding foundation depicting a single support module according to a second embodiment of the present invention.
Figure 10:
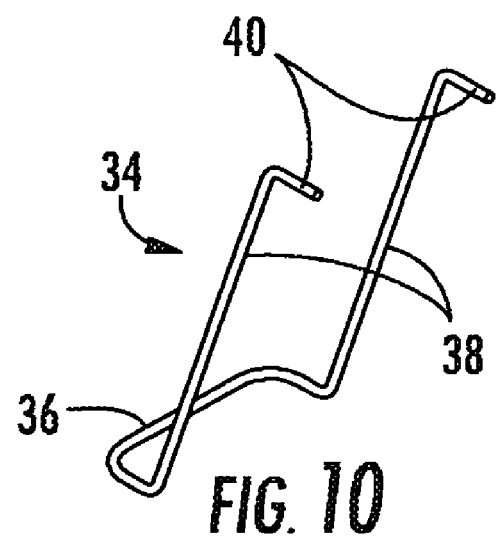
FIG. 10 is a perspective view of a single wire element of the support module of FIG. 9.
Figure 11:
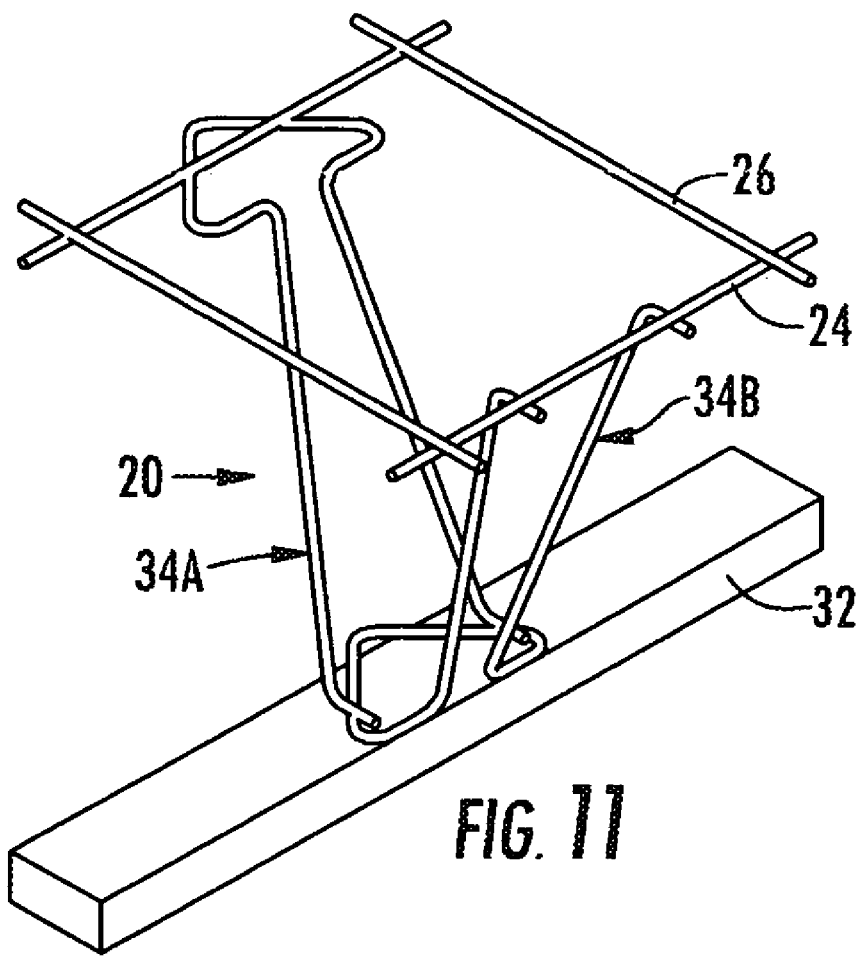
FIG. 11 is a perspective view of a fragmentary section of a bedding foundation depicting a single support module according to a third embodiment of the present invention.
Figure 12:
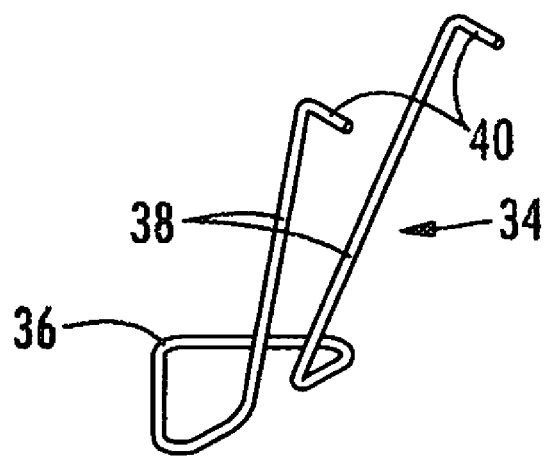
FIG. 12 is a perspective view of a single wire element of the support module of FIG. 11.

FIGS. 9 and 10 depict a simplified embodiment of wire-form element 34 (FIG. 10) and support module 20 (FIG. 9) wherein the bridge portion 36 is of a substantially straight, elongated, generally rectangular configuration with legs 38 extending obtusely therefrom in parallel relation to one another. Because the legs 38 of each wire-form element 34 are parallel to one another, the two wire-form elements 34A, 34B are of slightly differing widths (one more narrow than the other, to facilitate welded connection of the feet 40A of one wire-form element 34A to the bridge portion 36B of the other wire-form element 34B. The support module 20 of FIG. 9 may be utilized in substantially all of the same applications and embodiments in bedding foundations 10 as above-described with respect to the support module 20 of FIGS. 1-8 and 21-22.

Figure 13:
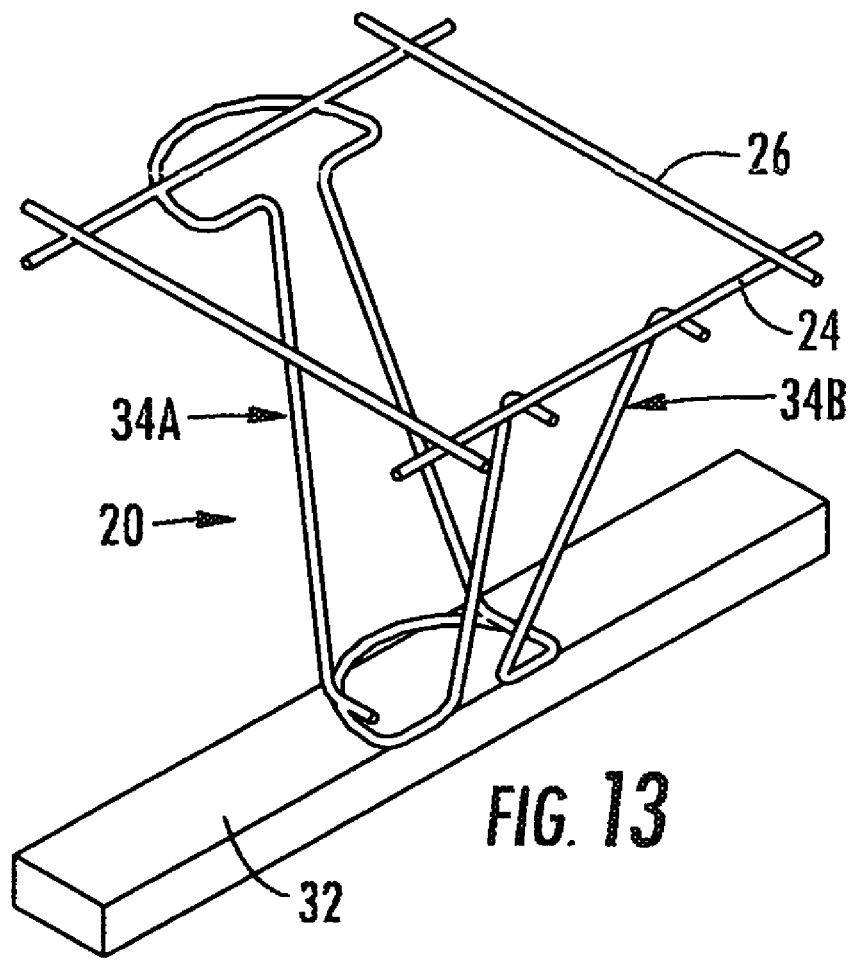
FIG. 13 is a perspective view of a fragmentary section of a bedding foundation depicting a single support module according to a fourth embodiment of the present invention.
Figure 14:
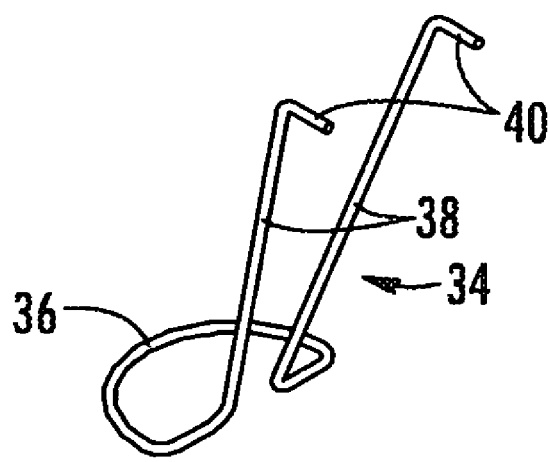
FIG. 14 is a perspective view of a single wire element of the support module of FIG. 13.
Figure 15:
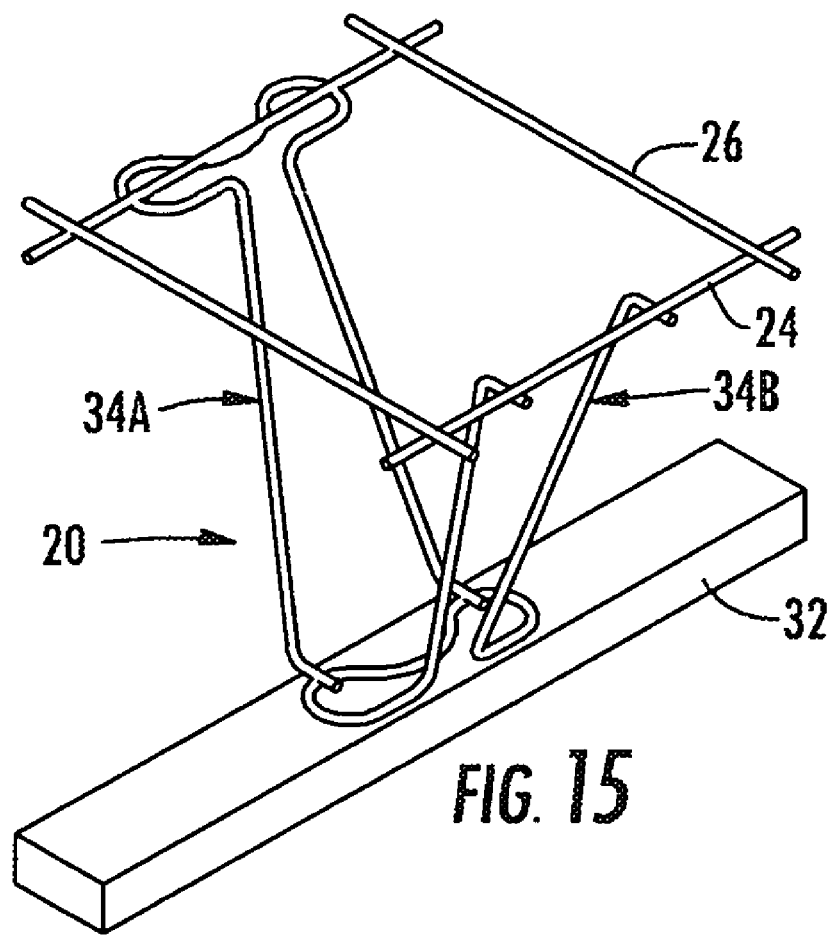
FIG. 15 is a perspective view of a fragmentary section of a bedding foundation depicting a single support module according to a fifth embodiment of the present invention.

FIGS. 11-16 depict alternative embodiments which further illustrate that various other configurations are possible for the central bridge portion 36 in support modules 20 in accordance with the present invention. In the support module 20 of FIG. 11, the central bridge portion 36 in each constituent wire-form element 34 (FIG. 12) is substantially triangular in shape. In the embodiment of support module 20 shown in FIG. 13, the central bridge portion 36 of each constituent wire-form element 34 (FIG. 14) is arcuate, more particular semi-circular. FIG. 15 depicts an embodiment of support module 20 wherein the central bridge portion 36 of each constituent wire-form element 34 (FIG. 16) is sinusoidal, basically a modification of the oval shape of the central bridge portion 36 in the embodiment of FIG. 1, with a symmetrically arcuate bend centrally along the side opposite the legs 38.

These differing configurations of the central bridge portion 36 enable variations in the staple locations by which the base portions 42 of the support modules 20 maybe optimally affixed centrally to the slats 32 of the wooden base frame 18 spaced from the front and back edges of the slats 32. For example, the triangular configuration of the central portion 36 in the embodiment of FIGS. 11 and 12 accomplishes substantially full front-to-back edge coverage of the wooden slats 32 while enabling the staples to be placed more centrally of the slats 32 and not undesirably close to the front or back edges of the slats where the affixing staples may not most securely and fully penetrate the wood. The semi-circular configuration of the central bridge portion 36 in the embodiment of FIGS. 13 and 14 provides similar advantages in fully covering the wood slats 32 while providing ample staple locations centrally between the front and back edges of the slats 32. The sinusoidal shape of the central bridge portion 36 in the embodiment of FIGS. 15 and 16 provides an alternative way of positioning staple locations away from the edges of the wooden slats 32.

Figure 1:
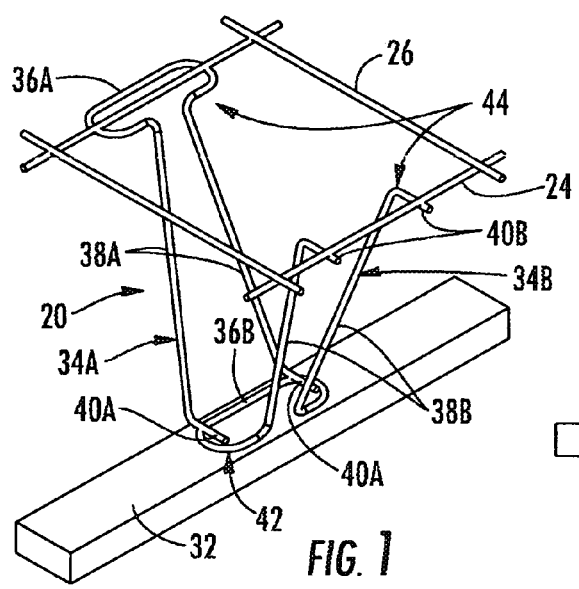
FIG. 1 is a perspective view of a fragmentary section of a bedding foundation depicting a single support module according to a first embodiment of the present invention.
Figure 2:
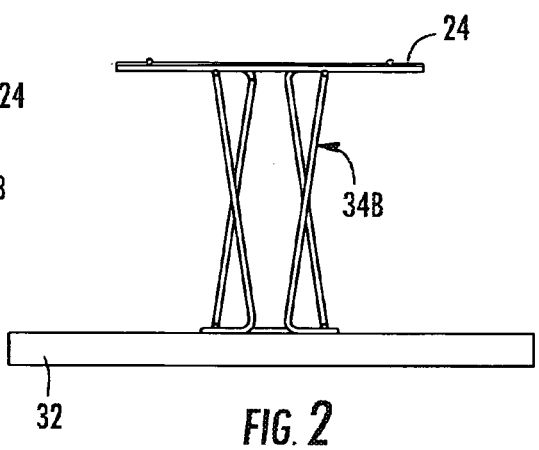
FIG. 2 is a front elevational view of the bedding foundation section and support module of FIG. 1.
Figure 3:
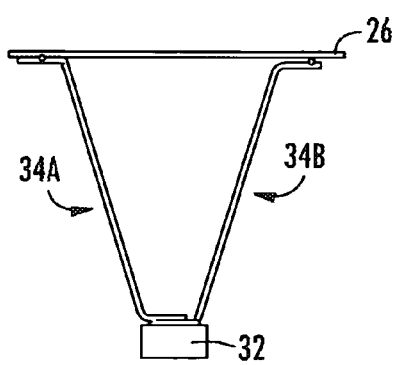
FIG. 3 is a side elevational view of the bedding foundation section and support module of FIG. 1.
Figure 4:
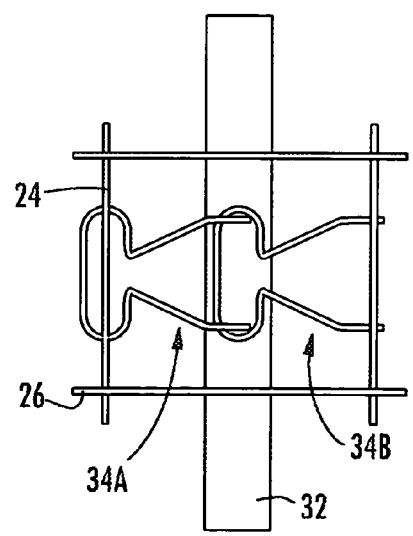
FIG. 4 is a top plan view of the bedding foundation section and support module of FIG. 1.
Figure 17:
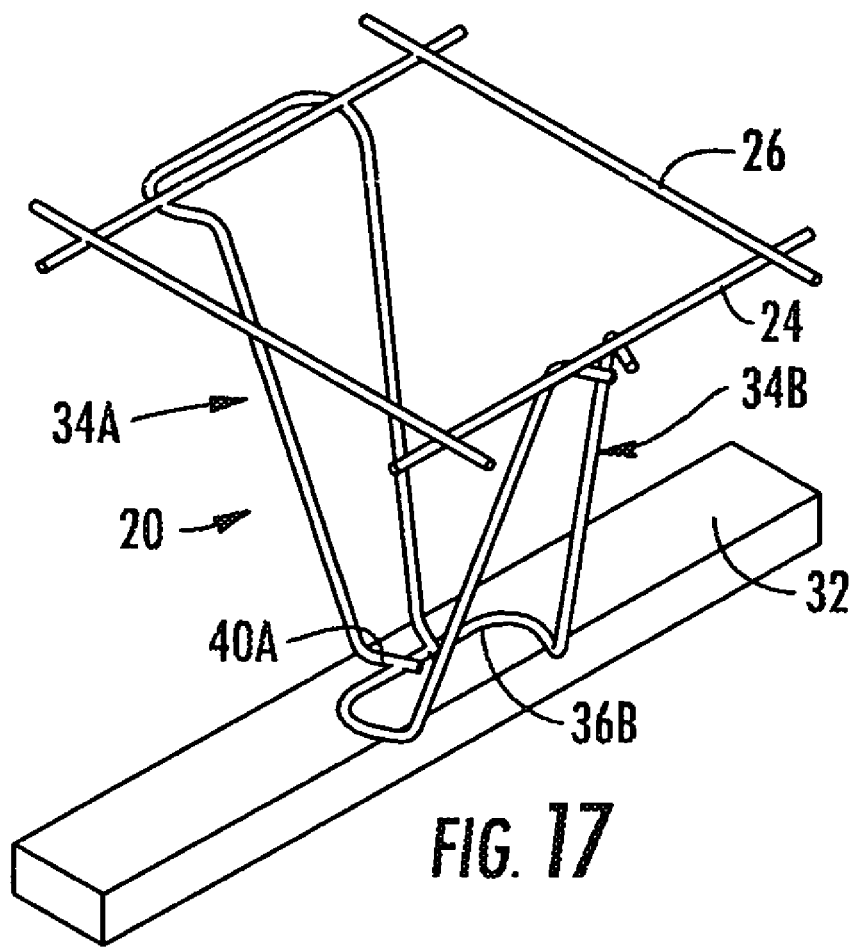
FIG. 17 is a perspective view of a fragmentary section of a bedding foundation depicting a single support module according to a sixth embodiment of the present invention.
Figure 18:
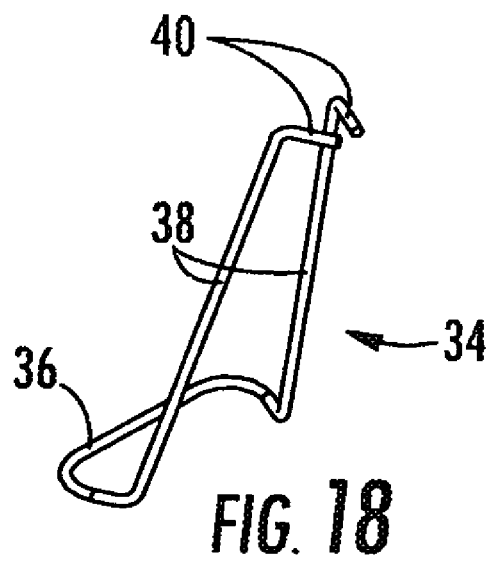
FIG. 18 is a perspective view of a single wire element of the support module of FIG. 17.

In each of the embodiments of FIGS. 11-16, the orientation of the legs 38 relative to the central bridge portion 36 in the constituent wire-form elements 34 in each support module 20 is substantially the same as in the support module 20 of the embodiment of FIG. 1, wherein the legs extend from spaced locations symmetrically on the central bridge portion 36 and diverge relative to one another from the central bridge portion 36 to the feet 40. FIGS. 17 and 18 illustrate that it is also possible within the scope and spirit of the present invention for the legs 38 to be oppositely oriented convergingly relative to one another. Specifically, in each wire-form element 34 in the embodiment of support module 20 represented by FIGS. 17 and 18, the legs 38 extend from relatively widely-spaced locations symmetrically at opposite ends of the central bridge portion 36 and converge relative to one another in the direction therefrom to the feet 40, with the feet 40 being inwardly angled relative to one another. Thus, in the assembled support module 20, the feet 40A of the one wire-form element 34A are affixed at relatively close spacings to one another to the central bridge portion 36B of the other wire-form element 34B. Otherwise, however, the support module 20 of FIGS. 17-18 functions in similar manner and can be utilized in substantially all of the same embodiments of bedding foundations as the other support module embodiments of FIGS. 1-16.

Figure 16:
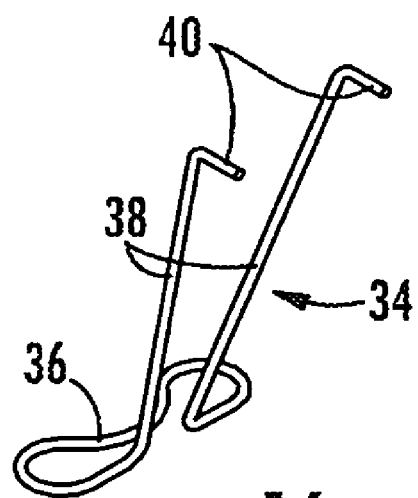
FIG. 16 is a perspective view of a single wire element of the support module of FIG. 15.
Figure 19:
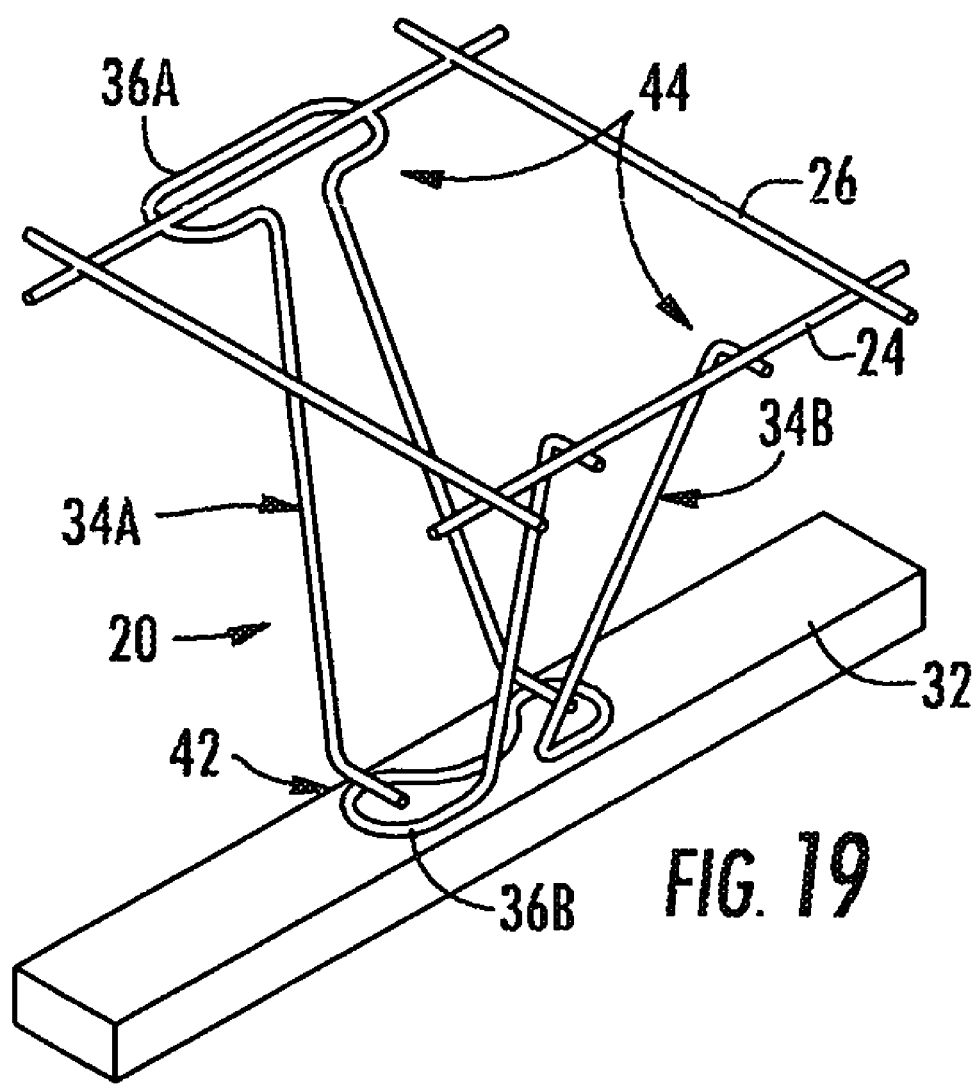
FIG. 19 is a perspective view of a fragmentary section of a bedding foundation depicting a single support module according to a seventh embodiment of the present invention.

As previously noted, it is also contemplated to be possible to fabricate a support module 20 within the scope of the present invention utilizing two wire-form elements 34A, 34B of differing configurations, which alternative is representatively illustrated by the embodiment of FIG. 19 wherein the wire-form element 34B has a central bridge portion 36B with a sinusoidal configuration according to FIG. 16 and the wire-form element 34A has a central bridge portion 36A of an ovoid configuration according to the embodiment FIG. 1. Such an embodiment maybe utilized to provide a base portion 42 with particular desired stapling locations, such as accomplished by the wire-form element of FIG. 16, whereas such is not needed in the central bridge portion 36A of the one wire-from element 34A forming a part of the top portion 44 of the support module 20.

Figure 20:
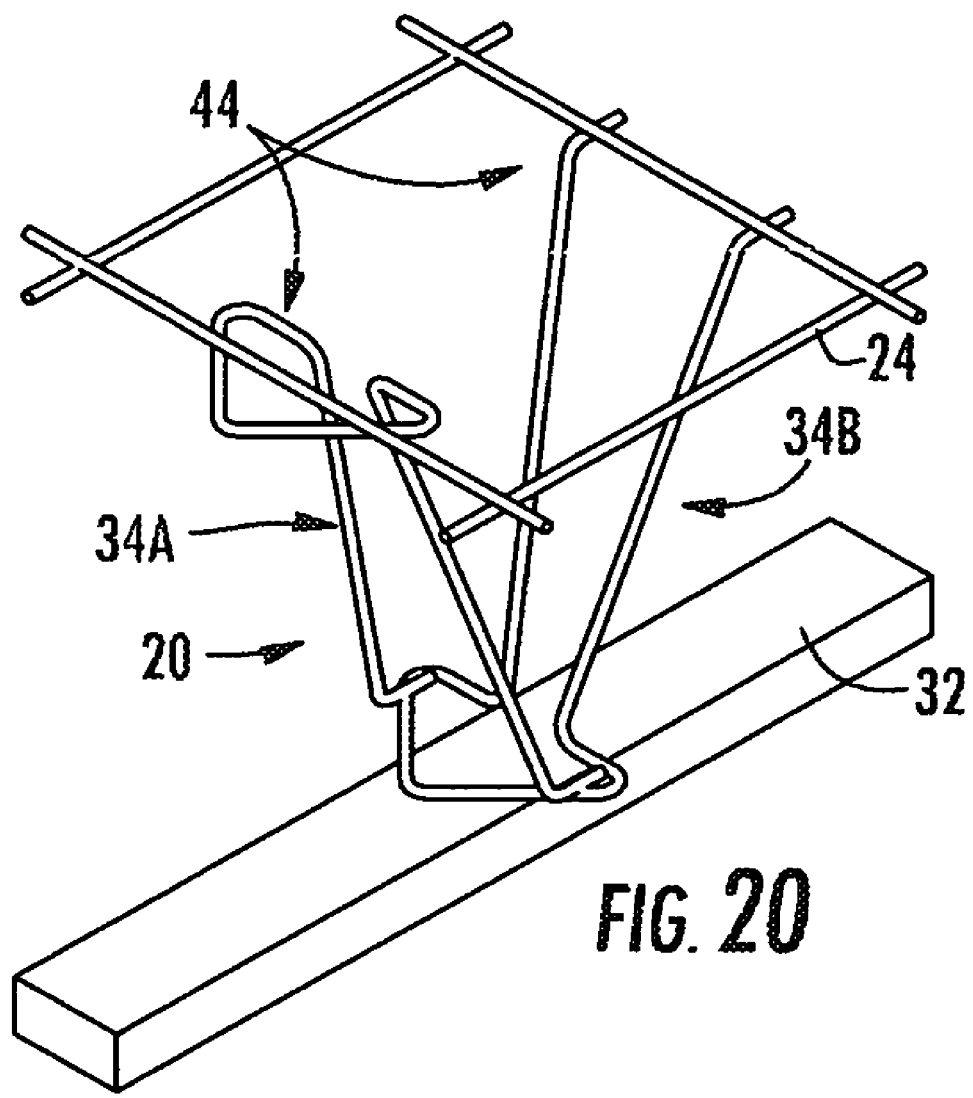
FIG. 20 is a perspective view of a fragmentary section of a bedding foundation depicting a single support module according to an eighth embodiment of the present invention.

While it may be desirable in many embodiments of bedding foundations 10 for the support modules 20 to be welded solely to the lateral grid wires 24 of the wire grid assembly 14, for the reasons discussed above, it is also possible within the scope and spirit of the present invention for the support modules 20 to be welded or otherwise affixed to only the longitudinal grid wires 26 in a wire grid assembly 14, or for some of the support modules 20 to be affixed to longitudinal grid wires 26 while other support modules 20 are affixed to lateral grid wires 24. The embodiment of FIG. 20 illustrates this possible embodiment of support modules 20 of the present invention in a bedding foundation. In such an embodiment, the longitudinal grid wires 26 of the wire grid assembly 14 must be disposed in pairs at appropriately close spacings to one another across the width of the wire grid assembly 14 to facilitate welded attachment of the top portions 44 of the support modules 20 to the longitudinal grid wires 26.

The variety and flexibility in the design of support modules 20 according to the present invention will thus be understood from the representative embodiments depicted in FIGS. 1-20. Fundamentally, each support module 20 in accordance with the present invention is fabricated of two wire-form elements 34 each basically fashioned from a single length of wire into a configuration presenting a planar central bridge portion 36 having some elongate dimension, preferably symmetrical, two spaced-apart legs 38 extending in a generally common direction from spaced locations on the central bridge portion 36, and two spaced-apart feet 40 at the terminal ends of the legs 38 and in a common plane with one another which is substantially parallel to the plane of the bridge portion 36. The feet 40A of one wire-form element 34A are affixed to the bridge portion 36B of the other wire-form element 34B with the respective legs 38A, 38B of both wire-form elements 34A, 34B extending in a generally common direction such that the bridge portion 36A of the one wire-form element 34A and the feet 40B of the other wire-form element 34B are disposed in a common plane. The two legs 38A of the one wire-from element 34A and the two legs 38B of the other wire-from element 34B diverge angularly away from one another to present a cup-like shape to the assembled module 20 enabling it to be nestably stackable with other like wire-form modules.

Otherwise, beyond these common characteristics among all of the support modules 20 of the present invention, many variations are contemplated to be possible, e.g., variations in the configuration of the central bridge portion 36, orientation of the legs 38 of an individual wire-form element 34 to be converging, diverging or parallel relative to one another, varied angular orientations of the feet 40 of a wire-form element 34 within their common plane, etc. These and all other iterations, variations and embodiments of wire-from elements 34 and support modules 20 are contemplated and intended to be within the overall scope and substance of the present invention.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A support module for use in a bedding foundation between a lower base and an upper support surface, the support module comprising two wire-form elements each comprised of a single length of wire formed into a configuration presenting a central bridge portion, two spaced-apart legs extending in a generally common direction from spaced locations on the central bridge portion, and two spaced-apart feet each at a terminal end of a respective one of the legs, the central bridge portion extending in a plane transverse relative to the legs and the feet lying in a common plane with each other spaced by the legs from and essentially parallel to the plane of the bridge portion, the feet of one wire-form element being affixed to the bridge portion of the other wire-form element with the respective legs of both wire-form elements extending in a generally common direction and with the bridge portion of the one wire-form element and the feet of the other wire-form element disposed in a common plane, whereby the bridge-portion of the other wire-form element is adapted for securement to the lower base of a bedding foundation and the feet of the other wire-form element and the bridge portion of the one wire-form element are adapted for securement to the upper support surface of a bedding foundation.

2. A support module according to claim 1, wherein the bridge portion has a symmetrical configuration.

3. A support module according to claim 1, wherein the bridge portion has an elongate extent.

4. A support module according to claim 2, wherein the feet of the one wire-form element are affixed symmetrically to the bridge portion of the other wire-form element.

5. A support module according to claim 1, wherein the legs of each wire-form element are inclined obtusely relative to bridge portion.

6. A support module according to claim 1, wherein the legs of at least one of the wire-form elements are oriented to diverge relative to one another in the direction away from the bridge portion.

7. A support module according to claim 6, wherein the legs of each of the wire-form elements are oriented to diverge relative to one another in the direction away from the bridge portion.

8. A support module according to claim 1, wherein the legs of at least one of the wire-form elements are oriented to converge relative to one another in the direction away from the bridge portion.

9. A support module according to claim 8, wherein the legs of each of the wire-form elements are oriented to converge relative to one another in the direction away from the bridge portion.

10. A support module according to claim 1, wherein the legs of at least one of the wire-form elements are essentially parallel to one another.

11. A support module according to claim 10, wherein the legs of each of the wire-form elements are essentially parallel to one another.

12. A support module according to claim 1, wherein the bridge portion is generally ovoid in shape.

13. A support module according to claim 1, wherein the bridge portion is generally arcuate in shape.

14. A support module according to claim 1, wherein the bridge portion is generally triangular in shape.

15. A support module according to claim 1, wherein the bridge portion is generally sinusoidal in shape.

16. A support module according to claim 1, wherein the two wire-form elements are of identical configurations.

17. A support module according to claim 1, wherein the two wire-form elements are of different configurations.

18. A support module according to claim 1, wherein the module is nestable with a like module.

19. A bedding foundation comprising:
   a wire grid assembly forming an upper support surface, the wire grid assembly including a rectangular border wire having parallel ends and parallel sides, a plurality lateral grid wires extending in spaced parallel relation to one another between the sides of the border wire and a plurality of longitudinal grid wires extending in spaced parallel relation to one another between the ends of the border wire and perpendicularly to the lateral grid wires, and
   a plurality of support modules, each support module comprising two wire-form elements each comprised of a single length of wire formed into a configuration presenting a central bridge portion, two spaced-apart legs extending in a generally common direction from spaced locations on the central bridge portion, and two spaced-apart feet each at a terminal end of a respective one of the legs, the central bridge portion extending in a plane transverse relative to the legs and the feet lying in a common plane with each other spaced by the legs from and essentially parallel to the plane of the bridge portion, the feet of one wire-form element being affixed to the bridge portion of the other wire-form element with the respective legs of both wire-form elements extending in a generally common direction and with the bridge portion of the one wire-form element and the feet of the other wire-form element disposed in a common plane, the plurality of support modules being arranged in a laterally and longitudinally spaced array relative to the wire grid assembly, each support module having the feet of the other wire-form element and the bridge portion of the one wire form element affixed to adjacent ones of the lateral or longitudinal grid wires.

20. A bedding foundation according to claim 19, wherein the foundation further comprises a lower base underlying the plurality of support modules, the lower base having a rectangular configuration essentially corresponding to the rectangular configuration of the wire grid assembly and comprising a plurality of slats arranged in spaced parallel relation to one another, the bridge portion of the other wire-form element of each support module being affixed to a respective one of the slats.

21. A bedding foundation according to claim 19, wherein at least selected support modules are affixed only to respectively adjacent lateral grid wires independently of the location of the longitudinal grid wires.

22. A bedding foundation according to claim 19, wherein at least selected support modules are affixed only to respectively adjacent longitudinal grid wires independently of the location of the lateral grid wires.

23. A bedding foundation according to claim 19, wherein selected support modules are affixed only to respectively adjacent lateral grid wires independently of the location of the longitudinal grid wires and other selected support modules are affixed only to respectively adjacent longitudinal grid wires independently of the location of the lateral grid wires.

24. A bedding foundation according to claim 19, wherein every support module is affixed only to respectively adjacent lateral grid wires independently of the location of the longitudinal grid wires.

25. A bedding foundation according to claim 19, wherein every support module is affixed only to respectively adjacent longitudinal grid wires independently of the location of the lateral grid wires.

26. A bedding foundation according to claim 19, wherein the bridge portion of each support module has a symmetrical configuration.

27. A bedding foundation according to claim 19, wherein the bridge portion of each support module has an elongate extent.

28. A bedding foundation according to claim 19, wherein the feet of the one wire-form element of each support module are affixed symmetrically to the bridge portion of the other wire-form element thereof.

29. A bedding foundation according to claim 19, wherein the legs of each wire-form element are inclined obtusely relative to bridge portion.

30. A bedding foundation according to claim 19, wherein the legs of at least one of the wire-form elements of each support module are oriented to diverge relative to one another in the direction away from the bridge portion.

31. A bedding foundation according to claim 30, wherein the legs of each of the wire-form elements of each support module are oriented to diverge relative to one another in the direction away from the bridge portion.

32. A bedding foundation according to claim 19, wherein the legs of at least one of the wire-form elements of each support module are oriented to converge relative to one another in the direction away from the bridge portion.

33. A bedding foundation according to claim 32, wherein the legs of each of the wire-form elements of each support module are oriented to converge relative to one another in the direction away from the bridge portion.

34. A bedding foundation according to claim 19, wherein the legs of at least one of the wire-form elements of each support module are essentially parallel to one another.

35. A bedding foundation according to claim 34, wherein the legs of each of the wire-form elements of each support module are essentially parallel to one another.

36. A bedding foundation according to claim 19, wherein the bridge portion of each support module is generally ovoid in shape.

37. A bedding foundation according to claim 19, wherein the bridge portion of each support module is generally arcuate in shape.

38. A bedding foundation according to claim 19, wherein the bridge portion of each support module is generally triangular in shape.

39. A bedding foundation according to claim 19, wherein the bridge portion of each support module is generally sinusoidal in shape.

40. A bedding foundation according to claim 19, wherein the two wire-form elements of each support module are of identical configurations.

41. A bedding foundation according to claim 19, wherein the two wire-form elements of each support module are of different configurations.

42. A bedding foundation according to claim 19, wherein the bedding foundation is nestable with a like bedding foundation.

* * * * *